(12) United States Patent
Dabral et al.

(10) Patent No.: US 9,704,269 B2
(45) Date of Patent: Jul. 11, 2017

(54) EFFICIENT METHODOLOGY TO PROCESS WIDE DYNAMIC RANGE IMAGES

(71) Applicant: Texas Instruments Incorporated, Dallas, TX (US)

(72) Inventors: Shashank Dabral, Allen, TX (US); Hamid Rahim Sheikh, Allen, TX (US); Rajasekhar Reddy Allu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 248 days.

(21) Appl. No.: 14/550,671

(22) Filed: Nov. 21, 2014

(65) Prior Publication Data

US 2016/0148356 A1   May 26, 2016

(51) Int. Cl.
 *G06T 9/00* (2006.01)
 *G06T 1/20* (2006.01)
 *G06T 5/00* (2006.01)

(52) U.S. Cl.
 CPC ............. *G06T 9/00* (2013.01); *G06T 1/20* (2013.01); *G06T 5/007* (2013.01); *G06T 2207/20208* (2013.01)

(58) Field of Classification Search
 USPC ........................................ 382/166, 232–233
 See application file for complete search history.

(56) References Cited

U.S. PATENT DOCUMENTS

| 8,493,468 B2* | 7/2013 | Nomura | H04N 5/235 348/223.1 |
| 8,854,412 B2* | 10/2014 | Tian | H04N 7/15 348/14.01 |
| 8,947,555 B2* | 2/2015 | Velarde | H04N 5/2355 348/223.1 |
| 2011/0050950 A1* | 3/2011 | Nomura | H04N 5/235 348/224.1 |
| 2012/0008005 A1 | 1/2012 | Fukunishi | |
| 2012/0262600 A1 | 10/2012 | Velarde et al. | |
| 2013/0329098 A1 | 12/2013 | Lim et al. | |
| 2014/0085398 A1* | 3/2014 | Tian | H04N 7/15 348/14.01 |

* cited by examiner

*Primary Examiner* — Ishrat I Sherali
(74) *Attorney, Agent, or Firm* — Ronald O. Neerings; Charles A. Brill; Frank D. Cimino

(57) ABSTRACT

An image processor capable of processing wide-dynamic-range (WDR) image data using a native 12-bit image pipe. In one embodiment, the processor receives compressed wide-dynamic-range image data from a WDR image sensor. The compressed wide-dynamic-range image data is decompanded. Long-exposure image data is then extracted from the decompanded image data, and pre-processing is performed on the long-exposure image data. Short-exposure image data is also extracted from the decompanded image data, and pre-processing is performed on the short-exposure image data. The pre-processed long-exposure image data is merged with the pre-processed short-exposure image data. Tone mapping is performed on the merged image data.

29 Claims, 4 Drawing Sheets

EFFICIENT METHODOLOGY TO PROCESS WIDE DYNAMIC RANGE IMAGES

BACKGROUND

Wide dynamic range (WDR) processing is becoming increasingly popular in modern-day imaging systems. Wide dynamic range describes an attribute of an imaging system that can record greater scene details, from shadows to highlights, than normal. WDR images are able to capture a much higher dynamic range and as such are useful for applications like security and automotive which are expected to generate correctly exposed images even in adverse lighting conditions. Such adverse lighting conditions might include surveillance cameras operating in the morning/evening hours when the sun is low on the horizon and facing the camera, automotive cameras when the car is emerging from a dark parking lot to a sunlit road, and indoor scenes, e.g., a dark room with a sun-lit window, where both the interior of the room as well as the scenery outside should be properly exposed. Under such extreme lighting conditions, it is desirable that the generated image have minimal areas of blow-out regions while still showing good detail in the dimly-lit portions of the image. Tone-mapping image processors can be used to address this problem.

FIG. 1 is a data-flow diagram representing a typical data path 100 for a standard (non-WDR) image processing pipeline. In FIG. 1, the raw image data consists of 12-bit data blocks, each of which represents one image pixel. All of the image processor blocks support only 12-bit data width and the image pipe is able to support a maximum of 12-bit raw pixel data at one pixel/cycle throughput. In FIG. 1, an image sensor stores sensed image data in memory 110. A read-DMA unit 120 reads the raw image data from memory 110 using a direct-memory-access operation and forwards it to a pre-processing block 130 of an image processor 125. The pre-processing block 130 performs various image processing functions and provides the pre-processed image data to the image pipe 140 of the image processor 125. The image pipe 140 is a hardware image-processing module that generates image data in a particular image data format (such as YUV format) from raw image data. The image pipe 140 also performs various image processing functions. It will be noted that while FIG. 1 is a data-flow diagram as opposed to a functional block diagram, the pre-processing block 130 and the image pipe 140 are shown to be within the dashed box 125 representing the image processor to indicate that the functional blocks that perform those functions are included within the image processor. The image processor 125 stores the processed and formatted image data generated by the image pipe 140 in memory 110. The image processor blocks, i.e., pre-processing block 130 and image pipe 140 support only 12-bit data width. Thus the image pipe 140 is able to support a maximum of 12-bit raw pixel data at one pixel/cycle throughput.

FIG. 2 is a data-flow diagram representing a typical data path 200 supporting wide-dynamic-range image processing. Certain WDR image sensors can optionally compress the pixel data before sending it over the serial interface. FIG. 2 illustrates a scenario wherein the native data width is 24 bits and the pixel data is compressed within the sensor to 12 bits before storing the pixel data in memory 210. The read-DMA unit 220 reads the compressed image data from memory 210 and forwards it to a decompanding block of an image processor 225. The decompanding block 230 decompands, i.e., decompresses, the image data to its native 24 bits. The terms decompand and decompress will be used interchangeably throughout this specification. The decompanded 24-bit data is provided to pre-processing block 230 of the image processor 225. The pre-processing block 230 performs various image processing functions and provides the pre-processed image data to a global tone-mapping stage 250. Tone mapping is a technique used to map one set of colors to another to approximate the appearance of high-dynamic-range images in a medium that has a more limited dynamic range. In global tone mapping, every pixel in the image is mapped in the same way, independent of the value of surrounding pixels in the image. The global tone mapping reduces the dynamic range of the image data, from 24 to 16 bits in the example of FIG. 2. The globally tone-mapped pixel data is then provided to a local tone-mapping stage 260. In local tone-mapping, the parameters of the mapping function vary from pixel to pixel, according to parameters of the surrounding pixels. In other words, the effect of the algorithm varies in each pixel according to the local features of the image. Thus the local tone-mapping algorithms are much more complex than the global tone-mapping functions. The local tone-mapping further reduces the dynamic range of the image data, from 16 to 12 bits in the example of FIG. 2, while still preserving details in the highlights as well as the shadow regions of the image. The result of the local tone-mapping is then provided to the image pipe 270 of the image processor 225. The decompanding block 230, pre-processing block 240, global tone-mapping block 250, local tone-mapping block 260, and image pipe 270 are all shown to be within the dashed box 225 representing the image processor to indicate that the functional blocks that perform those functions are included within the image processor. The image processor 225 then stores the processed and formatted image data in memory 210.

A potential drawback of this data flow as represented by FIG. 2 is that the pre-processing block 240 needs to be expanded to support 24-bit data. The pre-processing block 240 is a complex processing block which supports a variety of processing functions including noise filtering, defect pixel correction, DC clamp removal, lens shading correction, and auto white balance correction. It is optimal for these features to be implemented before the tone-mapping logic to achieve the desired image quality. The noise filtering and defect pixel correction directly impact the quality of the tone-mapping logic, the DC clamp removal should occur before white balance is applied (preferably before tone-mapping), and similarly the lens shading correction should occur prior to applying any non-linear operation.

Enhancing the image processing modules to support a 24-bit data path requires the logic data path to be expanded to 24 bits, which has significant logic area overhead. Similarly, the line memories corresponding to each of the image processing modules have to be expanded in order to accommodate 24-bit data. The noise filters in particular tend to have significant line memories which have a huge impact on memory area. In the example illustrated by FIG. 2, the logic area would have to be doubled to support a 24-bit data path for the pre-processing blocks. Similarly, the memory area footprint would increase by roughly 80-90% to account for the 2× memory sizes (memory area does not scale linearly with the size of the memories as there is area associated with the number of ports which doesn't change in this case). Enhancing the image processing modules to support 24 bits also has the additional burden of schedule and R&D cost associated with the development.

SUMMARY

One embodiment of the present invention is directed to a method of processing single-frame wide-dynamic-range image data. Pursuant to such a method, compressed wide-dynamic-range image data is received from a WDR image sensor. The compressed wide-dynamic-range image data is decompanded. Long-exposure image data is then extracted from the decompanded image data, and pre-processing is performed on the long-exposure image data. Short-exposure image data is also extracted from the decompanded image data, and pre-processing is performed on the short-exposure image data. The pre-processed long-exposure image data is merged with the pre-processed short-exposure image data. Tone mapping is performed on the merged image data.

Another embodiment of the invention is directed to a wide-dynamic-range image processor comprising pre-processing functionality, a merge module, and a tone-mapping module. The pre-processing functionality is operable to independently process a long-exposure image data block and a short-exposure image data block. The merge module is operable to merge a pre-processed long-exposure image data block with a pre-processed short-exposure image data block to produce a merged image data block. The tone-mapping module is operable to perform tone mapping on the merged image data block.

Another embodiment of the invention is directed to a wide-dynamic-range image processing system that includes a wide-dynamic-range image sensor and a wide-dynamic-range image processor. The wide-dynamic-range image sensor senses a long exposure image and a short-exposure image and generates a wide-dynamic-range image data block. The wide-dynamic-range image processor includes an extracting module, pre-processing functionality, a merge module, and a tone-mapping module. The extracting module extracts a long-exposure image data block and a short-exposure image data block from the wide-dynamic-range image data block. The pre-processing functionality independently processes the long-exposure image data block and the short-exposure image data block. The merge module merges the pre-processed long-exposure image data block with the pre-processed short-exposure image data block to produce a merged image data block. The tone-mapping module performs tone mapping on the merged image data block.

DETAILED DESCRIPTION

Embodiments of the present invention are directed generally towards a wide-dynamic-range image processor capable of processing WDR image data using a native 12-bit image processing pipeline.

Figure 1:
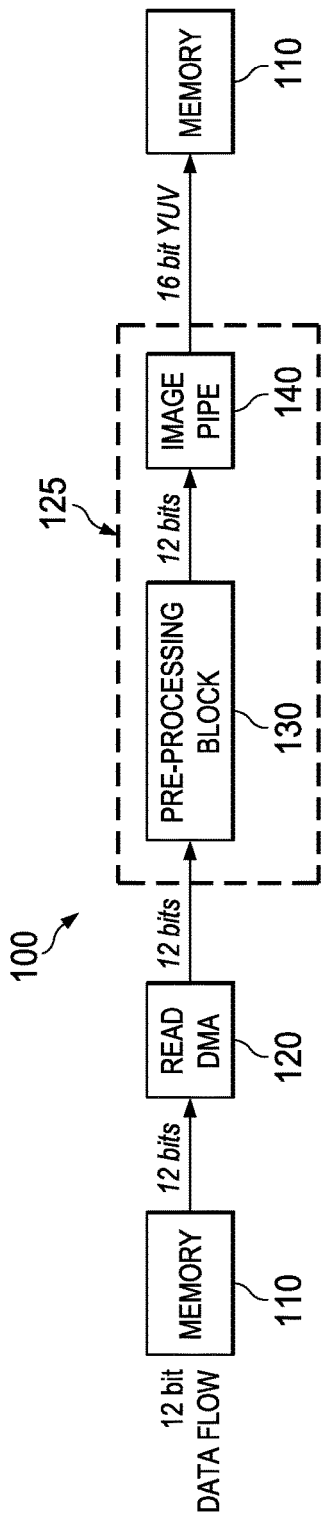
FIG. 1 is a data-flow diagram representing a typical data path for a standard (non-WDR) image processing pipeline.
Figure 2:
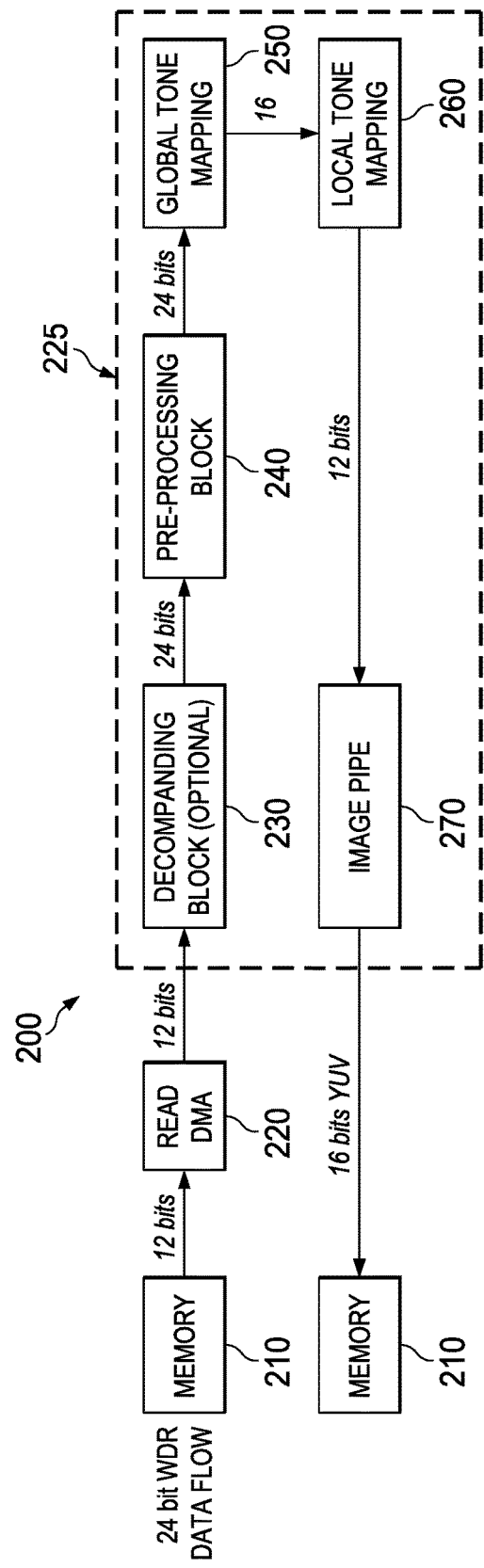
FIG. 2 is a data-flow diagram representing a typical data path supporting wide-dynamic-range image processing.
Figure 3:
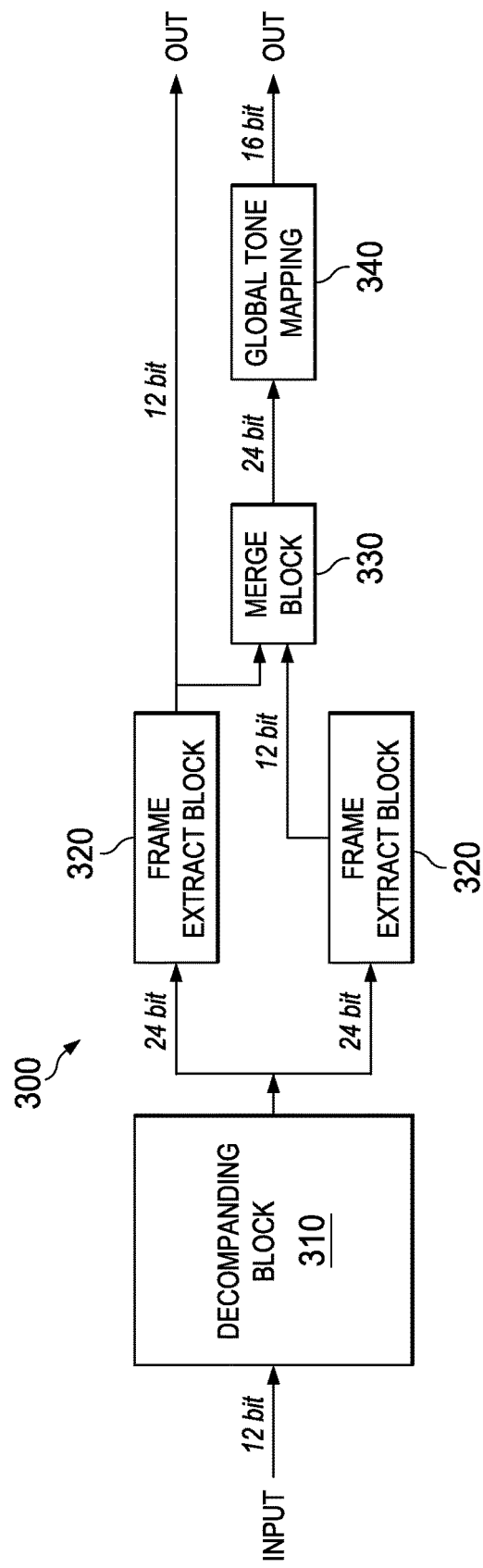
FIG. 3 is a functional block diagram of a wide-dynamic-range image processor according to an illustrative embodiment of the present invention.

FIG. 3 is a functional block diagram of a wide-dynamic-range image processor 300 according to an illustrative embodiment of the present invention. The image processor 300 supports WDR data generated by native WDR sensors. The decompanding block 310 receives pixel data that has been compressed by an image sensor and decompresses it. In the illustrative embodiment of FIG. 3, the received image data has been compressed from 24 bits down to 12 bits and the decompanding block decompresses the data back to its native 24 bits. The frame extract block 320 extracts a long-exposure frame and a short-exposure frame from a merged WDR frame generated by the sensor, as will be described in more detail below with respect to FIG. 4. In the illustrative embodiment of FIG. 3, the extracted long- or short-exposure pixel data comprises a 12-bit pixel data block. The merge block 330 merges an extracted long-exposure frame with an extracted short-exposure frame to create a wide-dynamic-range frame. The global tone mapping block 340 can either compress data or perform a global tone map to reduce the dynamic range of the pixel data.

Figure 4:
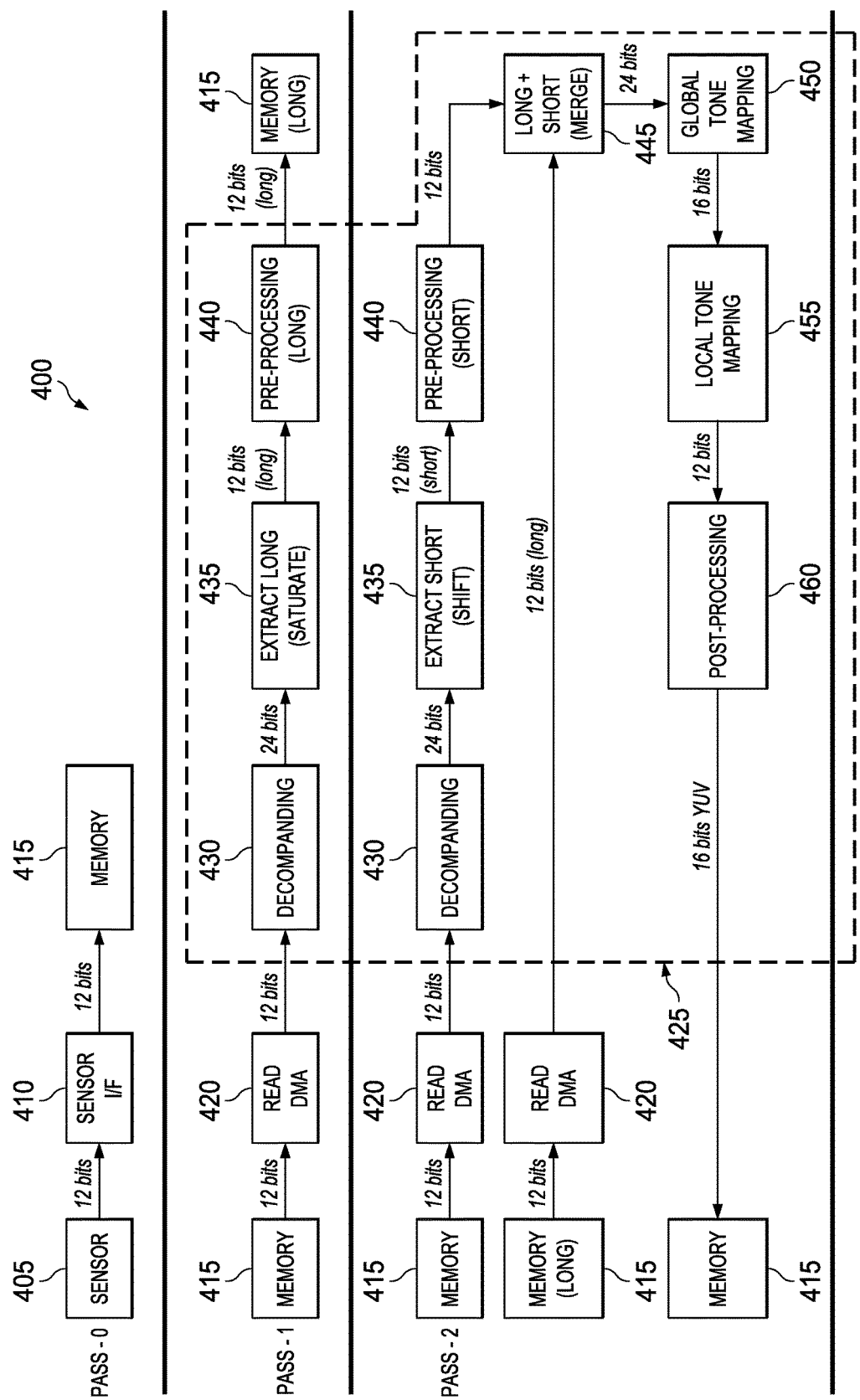
FIG. 4 is a data-flow diagram representing a data path supporting image processing of a single-frame wide-dynamic-range image data block.

FIG. 4 is a data-flow diagram representing a data path 400 supporting image processing of a single-frame wide-dynamic-range image data block. In the scenario represented by FIG. 4, the image sensor 405 senses a first image of a given subject using an exposure of a relatively short duration. The image sensor 405 also senses a second image of the same subject using an exposure of a relatively long duration. The image sensor 405 creates a high-bit-width frame, that includes information regarding both the short-exposure image and the long-exposure image, and sends it to the image processor, such as image processor 300, in a compressed/companded format. In the illustrative embodiment represented by FIG. 4, pixel data with a bit depth of 24 bits is generated within the sensor 405 and is compressed to 12 bits before sending it to the image processor. It is to be understood that these data block bit-widths are merely illustrative and that a WDR image processor in accordance with the present invention can support other bit-widths as well. The image processor splits the image into two (long and short) exposure frames and pre-processes them independently. The two pre-processed images are then merged to regenerate the 24-bit image before tone mapping and further post-processing can take place.

The data flow diagram of FIG. 4 shows three processing passes, labeled pass 0, pass 1, and pass 2. In pass 0, a sensor interface unit 410 interfaces with the WDR image sensor 405 and stores the pixel data in memory 415. In one illustrative embodiment, the memory unit 415 comprises a double-data-rate synchronous dynamic random-access memory (DDR-SDRAM) unit. The pixel data is in compressed format and the pixel bit-width in the example of FIG. 4 is 12 bits/pixel.

In the first processing pass of the image processor, labeled pass 1 in FIG. 4, a read-DMA unit 420 reads the data from memory unit 415, using a direct memory access operation, and forwards it to the decompanding unit 430 within the image processor 425. The decompanding block 430, extract block 435, pre-processing block 440, merge block 445, global tone-mapping block 450, local tone-mapping block 455, and post-processing block 460 are all shown to be within the dashed box 425 representing the image processor to indicate that the functional blocks that perform those functions are included within the image processor. The decompanding unit 430 generates an uncompressed pixel data block which, in the illustrative embodiment of FIG. 4, is 24 bits wide. The decompanded data is then passed through an extract unit 435, which uses a saturate operation to extract the 12-bit frame representing the long exposure. The long-exposure data block is then processed independently via the pre-processing block 440 before being stored back into the memory unit 415. The pre-processing block is a complex processing block which is capable of performing a variety of processing functions including noise filtering, defect pixel correction, DC clamp removal, lens shading correction, and auto white balance correction.

In the second processing pass of the image processor, labeled pass 2 in FIG. 4, the read-DMA unit 420 reads the full-frame data from the memory unit 415 and forwards it to the decompanding unit 430 within the image processor 425. The decompanding unit 430 generates an uncompressed pixel data block which, in the illustrative embodiment of FIG. 4, is 24 bits wide. The decompanded data is then passed through an extract unit 435, which uses a shift operation to extract an independent 12-bit frame corresponding to the short exposure. The short-exposure data block is then processed independently via the pre-processing block 440. Note that in this sequence of operation, the pre-processing stages 440 of the image processor 425 remain in 12 bits and are not expanded to 24 bits, minimizing hardware re-design effort and silicon area cost. The pre-processed output (short-exposure data) of the pre-processing block 440 and the pre-processed long-exposure data stored in the memory unit 415 are directed to the WDR merge block 445, which recreates the pre-processed 24-bit image. The merged 24-bit image data is then processed through a global tone-mapping stage, which performs global tone-mapping on the merged image data. In the embodiment of FIG. 4, the global tone-mapping stage generates 16-bit tone-mapped image data. The globally tone-mapped image data is then processed through a local tone-mapping stage 455. In the embodiment of FIG. 4, the local tone-mapping stage 455 generates 12-bit tone-mapped image data. This locally tone-mapped image data is then directed through the rest of the post-processing stages 460, which perform various image processing functions on the pixel data. The post-processing block 460 generates image data in a particular image data format—16-bit YUV format in the illustrative embodiment of FIG. 4. The product of the post-processing block 460 is stored in memory 415.

The above approach allows a 24-bit image to be processed using a 12-bit image pipe with the addition of a global tone-mapping unit and a local tone-mapping unit. As such, there is significant savings in terms of logic and memory cost, as the internal pre-processing pipe is not required to be expanded to 24 bits. The split and merge process does not degrade image quality substantially and does not introduce any artifacts in the processed image. Pixel values in the range 0-4095 typically are represented by the long exposure and have no error. Pixel values greater than 4095 have quantization noise which is not significant. A WDR image sensor generates the short exposure using a gain of less than 1 (e.g., 0.25) such that the short exposure data does not saturate even for a large value of intensity. The short exposure frame is then shifted by an offset and merged inside the sensor with the long exposure frame to generate a WDR frame. Since the WDR frame data received by the image processor already has a gain factor incorporated in it, the subsequent decompression (decompanding) and shift down to extract the short-exposure frame does not add any additional error apart from the quantization noise. The presented approach does increase memory traffic and bandwidth somewhat due to the multiple memory passes which are required. However, system level analysis demonstrates that the increase in bandwidth is not significant within the context of modern day SOCs (system-on-a-chip).

Figure 5:
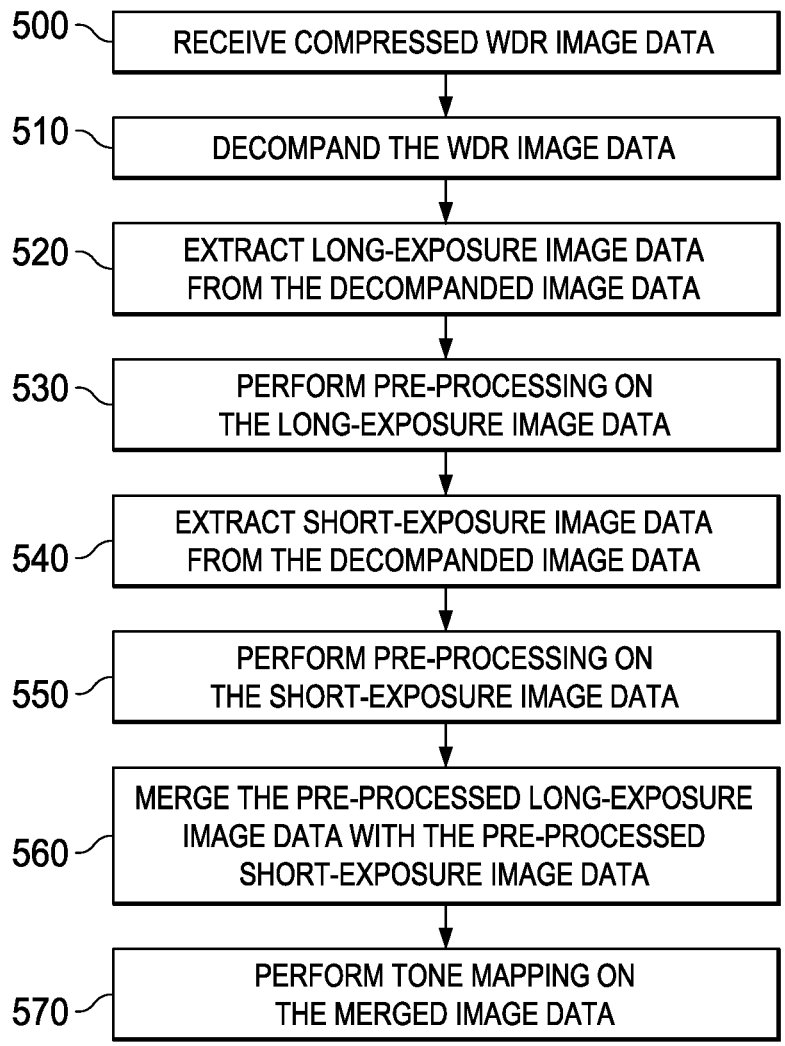
FIG. 5 is a flowchart representing a method of processing single-frame wide-dynamic range image data.

FIG. 5 is a flowchart representing a method of processing single-frame wide-dynamic-range image data. The method represented by FIG. 5 corresponds generally to the data flow diagram of FIG. 4. At block 500, compressed wide-dynamic-range image data is received from a WDR image sensor. At block 510, the compressed wide-dynamic-range image data is decompanded. At block 520, long-exposure image data is extracted from the decompanded image data. At block 530, pre-processing is performed on the long-exposure image data. At block 540, short-exposure image data is extracted from the decompanded image data. At block 550, pre-processing is performed on the short-exposure image data. At block 560, the pre-processed long-exposure image data is merged with the pre-processed short-exposure image data. Finally, at block 570, tone mapping is performed on the merged image data.

Image data generated by the image sensor usually contains a DC bias. It is desirable to remove this DC bias from the image data before further processing (specifically white balance correction) is applied. In embodiments of the present invention, the pre-processing block 440 of the image processor removes this DC bias (sometimes referred to as DC clamp) after the short-exposure and long-exposure frames have been extracted from the WDR frame data. Removing the DC clamp from the long-exposure image is direct and easily supported by the architecture, however the short exposure image requires further analysis. The short-exposure image is extracted by down-shifting the image by a certain number of bits (depending on the bit-width of the merged image received from the image sensor) and, as such, the DC clamp value is also reduced. For instance, if the sensor-introduced DC clamp was +128 and the bit depth was 18 bits, then after short frame extraction, the resulting DC Clamp value would be 128/64=2, since the short frame is extracted by shifting down by 6 bits, i.e., dividing by 64. However, if the image data bit-width is 20 bits then extracting the short-exposure frame requires a shift down by 8 bits (divide by 256). As such, any DC clamp value of less than 256 is reduced to zero. For instance, if the sensor DC clamp value was +128, then after the short-exposure frame extraction it is reduced to zero. Setting a value of the DC clamp correction in the pre-processing stage to either '1' or '0' introduces a bias error.

To minimize the DC bias error, in an illustrative embodiment of the present invention, a DC clamp offset is added within the frame extraction process. Prior to the short-exposure frame extraction, when the sensor DC Clamp is +128, an offset of +128 is added which would elevate the total DC value to 256. After the short-exposure frame extraction, the residual DC clamp would be '1,' which can be removed by programming the pre-processing stage 440 accordingly.

In conclusion, an image processor in accordance with embodiments of the present invention addresses WDR data flows wherein the image sensor generates a single WDR data frame that includes information about both a long-exposure image frame and a short-exposure image frame, as illustrated in FIG. 4. A unique combination of frame merge and split (i.e., extract) techniques is used to overcome the inability of native pre-processing stages to process greater than 12-bit data. These techniques provide significant logic and memory area cost savings.

Having thus described circuits and methods for processing wide-dynamic-range image data using a native 12-bit image processing pipeline by reference to certain of their preferred embodiments, it is noted that the embodiments disclosed are illustrative rather than limiting in nature and that a wide range of variations, modifications, changes, and substitutions are contemplated in the foregoing disclosure. For example, while portions of the specification, such as the data flow diagram of FIG. 4, refer to image data of specific bit-widths, it will be understood that these data elements can have other bit-widths in accordance with the present invention. Furthermore, in some instances, some features of the present invention may be employed without a corresponding use of the other features. Accordingly, it is appropriate that the appended claims be construed broadly and in a manner consistent with the broad inventive concepts disclosed herein.

What is claimed is:

1. A method of processing image data, comprising:
   receiving compressed image data;
   decompanding the compressed image data;
   extracting long-exposure image data from the decompanded image data;
   performing pre-processing on the long-exposure image data;
   extracting short-exposure image data from the decompanded image data;
   performing pre-processing on the short-exposure image data;
   merging the pre-processed long-exposure image data with the pre-processed short-exposure image data; and
   performing tone mapping on the merged image data.

2. The method of claim 1, fluffier comprising performing post-processing on the tone-mapped image data.

3. The method of claim 1 wherein performing tone mapping comprises performing global tone mapping on the merged image data and performing local tone mapping on the globally tone-mapped image data.

4. The method of claim 1 wherein performing pre-processing on the long-exposure image data comprises performing pre-processing on an n-bit long-exposure image data block, wherein performing pre-processing on the short-exposure image data comprises performing pre-processing on an n-bit short-exposure image data block, and wherein said merging comprises merging the n-bit pre-processed long-exposure image data block with the n-bit pre-processed short-exposure image data block to produce a 2n-bit merged image data block.

5. The method of claim 4 wherein n=12.

6. The method of claim 1 wherein performing pre-processing on the long-exposure image data and the short-exposure image data comprises removing a DC bias from the image data, and wherein extracting short-exposure image data from the decompanded image data comprises adding a DC bias offset to the short-exposure image data prior to extracting the short-exposure image data.

7. The method of claim 1 wherein the image data comprises wide-dynamic-range image data.

8. An image processor comprising:
   pre-processing functionality operable to independently process a long-exposure image-data block and a short-exposure image data block;
   a merge module operable to merge a pre-processed long-exposure image-data block with a pre-processed short-exposure image data block to produce a merged image data block;
   a tone-mapping module operable to perform tone mapping on the merged image data block;
   a decompanding module operable to decompand a compressed image data block; and
   an extracting module operable to extract a long-exposure image data block and a short-exposure image data block from the decompanded image data block and to provide the extracted long-exposure image data block and the extracted short-exposure image data block to the pre-processing functionality.

9. The image processor of claim 8, further comprising post-processing functionality operable to perform image processing on the tone-mapped image data block.

10. The image processor of claim 8, wherein the tone-mapping module comprises:
    a global tone-mapping module operable to perform global tone-mapping on the merged image data block; and
    a local tone-mapping module operable to perform local tone-mapping on the globally tone-mapped image data block.

11. The image processor of claim 8, wherein the pre-processing functionality employs an n-bit data path and is operable to independently process an n-bit long-exposure image data block and an n-bit short-exposure image data block, and wherein the merge module is operable to merge an n-bit pre-processed long-exposure image data block with an n-bit pre-processed short-exposure image data block to produce a 2n-bit merged image data block.

12. The image processor of claim 8 wherein the image processor is a wide-dynamic-range image processor and wherein said image data blocks are wide-dynamic-range image data blocks.

13. An image processing system comprising:
    an image sensor operable to sense a long exposure image and a short-exposure image and to generate and compress an image data block comprising information regarding said long exposure image and said short exposure image; and
    an image processor comprising:
       an extracting module operable to extract a long-exposure image data block and a short-exposure image data block from the image data block generated by the image sensor;
       a decompanding module operable to decompand the compressed image data block and to provide the decompressed image data block to the extracting module;
       pre-processing functionality operable to independently process the long-exposure image data block and the short-exposure image data block;
       a merge module operable to merge the pre-processed long-exposure image data block with the pre-processed short-exposure image data block to produce a merged image data block; and
       a tone-mapping module operable to perform tone mapping on the merged image data block.

14. The image processing system of claim 13, wherein the image processor further comprises post-processing functionality operable to perform image processing on the tone-mapped image data block.

15. The image processing system of claim 13, wherein the tone-mapping module comprises:
    a global tone-mapping module operable to perform global tone-mapping on the merged image data block; and
    a local tone-mapping module operable to perform local tone-mapping on the globally tone-mapped image data block.

16. The image processing system of claim 13, wherein the pre-processing functionality employs an n-bit data path and is operable to independently process an n-bit long-exposure image data block and an n-bit short-exposure image data block, and wherein the merge module is operable to merge the n-bit pre-processed long-exposure image data block with the n-bit pre-processed short-exposure image data block to produce a 2n-bit merged image data block.

17. The image processing system of claim 13, further comprising a memory module, and wherein the pre-processing functionality is operable to store the pre-processed long-exposure image data block in the memory module, and wherein the merge module is operable to receive and merge the pre-processed long-exposure image data block from the memory module and the pre-processed short-exposure image data block from the pre-processing functionality.

18. The image processing system of claim 13 wherein the image processing system is a wide-dynamic-range image processing system, the image processor is a wide-dynamic-range image processor, and wherein said image data blocks are wide-dynamic-range image data blocks.

19. An image processor comprising:
   circuitry for processing a long-exposure image-data block and a short-exposure image data block;
   circuitry for merging a pre-processed long-exposure image-data block with a short-exposure image data block to produce a merged image data block;
   circuitry for performing tone mapping on the merged image data block;
   circuitry for decompanding a compressed image data block; and
   circuitry for extracting a long-exposure image data block and a short-exposure image data block from the decompanded image data block and to provide the extracted long-exposure image data block and the extracted short-exposure image data block to the circuitry for processing a long-exposure image-data block and a short-exposure image data block.

20. The image processor of claim 19, farther comprising circuitry for performing image processing on the tone-mapped image data block.

21. The image processor of claim 19, wherein the circuitry for performing tone mapping on the merged image data block comprises:
   circuitry for performing global tone-mapping on the merged image data block; and
   circuitry for performing local tone-mapping on the globally tone-mapped image data block.

22. The image processor of claim 19, wherein the circuitry for processing a long-exposure image-data block and a short-exposure image data block employs an n-bit data path and is operable to independently process an n-bit long-exposure image data block and an n-bit short-exposure image data block, and wherein the circuitry for merging a pre-processed long-exposure image-data block with a short-exposure image data block is operable to merge an n-bit pre-processed long-exposure image data block with an n-bit pre-processed short-exposure image data block to produce a 2n-bit merged image data block.

23. The image processor of claim 19 wherein the image processor is a wide-dynamic-range image processor and wherein said image data blocks are wide-dynamic-range image data blocks.

24. An image processing system comprising:
   an image sensor operable to sense a long exposure image and a short-exposure image and to generate and compress an image data block comprising information regarding said long exposure image and said short exposure image; and
   an image processor comprising:
      circuitry for extracting a long-exposure image data block and a short-exposure image data block from the image data block generated by the image sensor;
      circuitry for decompanding the compressed image data block and to provide the decompressed image data block to the circuitry for extracting;
      circuitry for processing the long-exposure image data block and the short-exposure image data block;
      circuitry for merging the pre-processed long-exposure image data block with the pre-processed short-exposure image data block to produce a merged image data block; and
      circuitry for performing tone mapping on the merged image data block.

25. The image processing system of claim 24, wherein the image processor further comprises circuitry for performing image processing on the tone-mapped image data block.

26. The image processing system of claim 24, wherein the circuitry for performing tone-mapping module comprises:
   circuitry for performing global tone-mapping on the merged image data block; and
   circuitry for performing local tone-mapping on the globally tone-mapped image data block.

27. The image processing system of claim 24, wherein the circuitry for independently processing the long-exposure image data block and the short-exposure image data block employs an n-bit data path and is operable to independently process an n-bit long-exposure image data block and an n-bit short-exposure image data block, and wherein the circuitry for merging the pre-processed long-exposure image data block with the pre-processed short-exposure image data block is operable to merge the n-bit pre-processed long-exposure image data block with the n-bit pre-processed short-exposure image data block to produce a 2n-bit merged image data block.

28. The image processing system of claim 24, further comprising a memory module, and wherein the circuitry for processing the long-exposure image data block and the short-exposure image data block is operable to store the pre-processed long-exposure image data block in the memory module, and wherein the circuitry for merging the pre-processed long-exposure image data block with the pre-processed short-exposure image data block is operable to receive and merge the pre-processed long-exposure image data block from the memory module and the pre-processed short-exposure image data block from the pre-processing functionality.

29. The image processing system of claim 24, wherein the image processing system is a wide-dynamic-range image processing system, the image processor is a wide-dynamic-range image processor, and wherein said image data blocks are wide-dynamic-range image data blocks.

* * * * *